United States Patent [19]

Jenkins et al.

[11] Patent Number: 4,746,497
[45] Date of Patent: May 24, 1988

[54] PROCESS FOR THE PRODUCTION OF HIGH PURITY ZIRCONIA

[75] Inventors: David H. Jenkins, East Bentleigh; Martin R. Houchin, Pascoe Vale; Hari N. Sinha, Surrey Hills, all of Australia

[73] Assignee: Commonwealth Scientific and Industrial Research Organization

[21] Appl. No.: 923,143

[22] Filed: Sep. 24, 1986

[30] Foreign Application Priority Data

Feb. 1, 1985 [AU] Australia ............................. PG9105

[51] Int. Cl.$^4$ .............................................. C01G 25/02
[52] U.S. Cl. ........................................ 423/82; 423/85; 423/69; 423/75
[58] Field of Search .................... 423/82, 85, 69, 75

[56] References Cited

U.S. PATENT DOCUMENTS

| | | | |
|---|---|---|---|
| 1,297,371 | 3/1919 | Loveman | 423/75 |
| 1,460,766 | 7/1923 | Rich | 423/85 |
| 1,502,422 | 7/1924 | Cooper | 423/84 |
| 1,618,286 | 2/1927 | Kinzie | 423/75 |
| 3,849,532 | 11/1974 | Deneke et al. | 423/69 |
| 4,220,843 | 9/1980 | Borer et al. | 423/592 |

FOREIGN PATENT DOCUMENTS

| | | | |
|---|---|---|---|
| 224798 | 10/1959 | Australia | 423/85 |
| 44-23975 | 10/1969 | Japan | 423/82 |
| WO004158 | 9/1985 | World Int. Prop. O. | |
| 219024 | 7/1925 | United Kingdom | 423/82 |
| 544823 | 4/1942 | United Kingdom | 423/69 |
| 889791 | 2/1962 | United Kingdom | 423/82 |

*Primary Examiner*—Robert L. Stoll
*Assistant Examiner*—Paige C. Harvey
*Attorney, Agent, or Firm*—Bacon & Thomas

[57] ABSTRACT

A process for the production of high-purity zirconia from dissociated zircon or other zirconiferous material is disclosed. The process includes leaching of the zirconiferous material with concentrated sulphuric acid and continuously removing the water formed during leaching to maintain the concentration of sulphuric acid at a substantially constant level.

15 Claims, No Drawings

PROCESS FOR THE PRODUCTION OF HIGH PURITY ZIRCONIA

This invention relates to a process for obtaining high purity zirconia ($ZrO_2$) from zirconiferous materials, and is particularly concerned with the production of zirconia from dissociated zircon by sulphuric acid leaching.

Demand for high purity zirconia (99.9% $ZrO_2$ or better), is increasing, particularly for use in the production of partially stabilised zirconia (PSZ) ceramics and for various electronic applications. The most abundant and widely distributed zirconium mineral is zircon ($ZrSiO_4$) and many methods have been developed for the production of zirconia and other zirconium compounds from this mineral. The selection of a satisfactory process is very much dependant, not only upon the purity of the product required, but also on the nature of the waste products of the process and disposal problems which may be associated with them.

In general, the presently used processes involve either chemical or thermal decomposition of zircon to produce a mixture of zirconia and silica (or compounds thereof) followed by chemical treatment of the decomposition products to produce pure zirconia.

Chemical decomposition of zircon can be accomplished by sintering with alkali or alkaline earth oxides. Sodium hydroxide or sodium carbonate are usually used for this purpose and the reaction can be controlled to produce a product consisting of sodium zirconate and sodium silicate. This product is then leached with water to dissolve the sodium silicate and hydrolyse the sodium zirconate to crude hydrous zirconia, which is then further purified. For example, the crude zirconia may be dissolved in hydrochloric acid followed by sulphuric acid and reprecipitated as zirconium sulphate (e.g., $Zr(SO_4)_2.4H_2O$) by adjustment of the sulphate/water ratio of the solution or as hydrated zirconium oxide by precipitation with ammonia.

Zircon can also be completely dissociated by heating at temperatures in excess of 1800° C., for example using a plasma arc furnace. When zircon sand is injected into the plasma arc, it melts and dissociates into zirconia and silica. On rapid cooling, solidification occurs with the formation of extremely small zirconia crystallites in an amorphous silica matrix.

Dissociation of zircon can also be accomplished by heating in a conventional electric furnace (operating at about 2000° C.) or in a so-called "advanced electric reactor" (AER) furnace operating at about 2400° C. Furnaces of this latter type are described in International Patent Publication No. WO 85/04158 and the references cited therein.

The dissociated zircon product, however produced, may then be chemically treated to separate the zirconia from the silica. There are two basic approaches:

(a) Leaching with caustic soda to dissolve the silica and leave the zirconia crystallites as a relatively pure product.
(b) Treating with sulphuric acid to convert the zirconia to zirconium sulphate which can be separated from the unattacked silica.

The thermal-dissociation/alkali-leach process suffers from two main disadvantages. Firstly, the product seldom contains more than 99.4% $ZrO_2$ and must be further purified for uses requiring very high purity. Additionally, while the by-product of alkaline leaching, sodium metasilicate has a ready market in some countries for the detergent industry, there is little demand for it in Australia and disposal thus presents further problems.

Japanese Patent Publication No. 23975/1969 describes a process for producing high purity zirconia which involves dissociation of zircon by heating in an electric furnace (1900°–2000° C.) followed by rapid quenching
crushing the dissociated material to 100–300 mesh particles
treating the particles with concentrated sulphuric acid at 200°–300° for 4–5 hours then 300°–400° for 3–4 hours
leaching the thus-treated material with water to extract the zirconia as zirconium sulphate and subsequent chemical treatment to produce hydrated zirconium oxysulphate which is then pyrolyzed to give zirconia.

The overall yield of the process is 80–90% based on the zirconia content of the starting ore.

The need for grinding of the dissociated ore and the long acid-treatment times constitute serious economic disadvantages for this process.

We have now found that the efficiency of sulphuric acid leaching of dissociated zircon can be greatly enhanced if proper attention is paid to the removal from the system of the water which is produced during leaching, according to the reaction

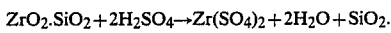
$$ZrO_2.SiO_2 + 2H_2SO_4 \rightarrow Zr(SO_4)_2 + 2H_2O + SiO_2.$$

Providing this water is continuously removed from the reaction system, thus maintaining constant acid concentration and temperature, leaching kinetics are considerably improved and satisfactory leaching can be achieved in 2 to 3 hours.

This procedure can also be applied, with advantage, to the leaching of other zirconiferous materials, such as baddeleyite, or impure zirconia from natural or artificial sources, such as partially-leached zirconia, for example as produced by alkali leaching of thermally-dissociated zircon.

There is a considerable body of prior art (for example U.S. Pat. No. 2,387,046), relating to the use of sulphuric acid to refine impure zircon and treat low silicon zirconia-based ores.

The prior art indicates that considerable difficulty may be encountered when the silica content of zirconia-containing ores is greater than 10%, paticularly when it is present as $ZrSiO_4$ rather than free silica (see U.S. Pat. No. 2,387,046). Consequently, processes have been developed which involve preliminary steps for breaking the $ZrO_2/SiO_2$ bond and reducing the $SiO_2$ level, e.g. by fusion with caustic soda (U.S. Pat. No. 2,387,046, U.S. Pat. No. 3,398,005).

Such caustic-treated materials may also be treated by the method of the present invention.

Accordingly, the present invention provides a process for the production of high-purity zirconia, which comprises the steps of leaching dissociated ziron or other zirconiferous material with concentrated sulphuric acid, and thereafter separating the resulting zirconium-containing product from silica or any other unattacked impurity, characterized in that water formed during the leaching reaction is continuously removed from the system.

Preferably, the water removal is effected in such a way as to maintain the sulphuric acid concentration at a substantially constant concentration of about 98%, so that the leaching temperature can be maintained in a range from about 300° C. to the maximum boiling point of the concentrated acid, preferably in the range 320° C.±5° C.

Zirconia can then be recovered from the zirconium sulphate produced during leaching by methods known per se, or by those described hereinafter.

As previously indicated, the prior art shows that it is preferable to finely grind dissociated zircon before leaching.

In the present process, however, at least for some dissociated products, grinding may be unnecessary. For example, zircon dissociated using the AER furnace can usually be satisfactorily leached without grinding.

Separation of the excess acid, anhydrous zirconium sulphate and silica may be carried out by filtration or any other suitable known method. The excess acid may be filtered from the solid anhydrous zirconium sulphate and silica (and any unreacted dissociated zircon). The solid mixture of silica and anhydrous zirconium sulphate may be leached with water to dissolve the zirconium sulphate which is then separated from the silica, by filtration.

The resulting solution is treated to precipitate hydrated zirconium sulphate, e.g., by evaporation and/or other adjustment of the sulphate/water ratio.

Alternatively, a measured amount of water can be added to the reaction products prior to the removal of the excess acid. Addition of water to the acid slurry generates heat and dissolves the anhydrous zirconium sulphate. The hot zirconium sulphate solution may be filtered from the silica (and any unreacted dissociated zircon). On cooling, the filtrate deposits hydrated zirconium sulphate.

In either case, the hydrated zirconium sulphate product is usually mainly in the form of the tetrahydrate. This product can be pyrolyzed to produce high purity zirconia and sulphur trioxide, which can be recycled, to the leaching stage, if desired.

An alternative method of producing zirconia from zirconium sulphate solution is to adjust the solution pH, e.g., by using ammonia, urea or sodium hydroxide, to precipitate hydrated zirconium oxide which on calcination gives zirconia.

The invention is illustrated by the following examples.

EXAMPLE 1

(a) 100 g samples of dissociated zircon of various particle sizes and produced by varying techniques were digested with 330 g of 98% sulphuric acid in a 500 cm$^3$ glass reactor fitted with a glass stirrer rotating continuously at 600 rev/min, a thermo-pocket containing a thermometer (or pyrometer) and an air-cooled reflux condenser. The reactor was heated by a heating mantle. The air-cooled condenser returned the refluxing sulphuric acid to the reactor whilst allowing the water produced from the reaction to escape. In this way, the refluxing sulphuric acid solution was maintained at a concentration of 98% and the reaction temperature was maintained at approximately 320° C. during the course of the reaction.

Heating and stirring were continued for 4 hours.

The progress of the reaction was monitored by removing samples of the refluxing suspension at known time intervals. These samples were immediately quenched, then washed free of soluble zirconium sulphate and the solid residue analysed for SiO$_2$ and residual ZrO$_2$ by XRF. The percentage of ZrO$_2$ leached from each sample of dissociated zircon was calculated.

(b) As a comparison, the leaching experiments described above were repeated except that the air-cooled reflux condenser was replaced by a water-cooled reflux condenser which refluxed both the acid and the water produced during the reaction to the reactor. The water content of the refluxing sulphuric acid solution increased as the reaction proceeded, thereby causing the reaction temperature to fall. Heating and stirring were continued for 4 hours and the progress of the leaching reaction was monitored, as in the earlier tests.

The results of the two series of leaching tests are given in Table 1. They clearly show that improved leaching rates are obtained when the leaching is carried out at constant temperature, in accordance with the present invention.

TABLE 1

Leaching rates of dissociated zirconia.

| | Percentage ZrO$_2$ leached | | | | | |
|---|---|---|---|---|---|---|
| | Total reflux leach time (h) | | | Constant temperature leach time (h) | | |
| Dissociated zircon used for reaction | 1 | 2 | 4 | 1 | 2 | 4 |
| Unground AERDZ* sand | 51.7 | 66.8 | 81.3 | 52.3 | 77.2 | 92.8 |
| Ground AERDZ sand, −45 μm | 80.3 | 88.5 | 93.7 | 92.7 | 95.1 | 95.1 |
| Unground AERDZ flour | 62.2 | 69.0 | 86.1 | 68.3 | 81.7 | 86.0 |
| Unground PDZ* | 26.0 | 44.9 | 55.5 | 26.0 | 46.6 | 56.8 |
| Ground PDZ, −150 + 106 μm | 35.3 | 51.9 | 66.5 | 36.9 | 58.9 | 73.3 |
| Ground PDZ, −75 + 45 μm | 54.4 | 69.9 | 82.3 | 62.2 | 83.9 | 89.8 |

*AERDZ = Advanced Electric Reactor Dissociated Zircon.
PDZ = Plasma Dissociated Zircon.

EXAMPLE 2

A leaching test using PDZ(−75+45 μm) was performed as described in Example 1. After 4 hours at constant temperature, heating was terminated and the suspension filtered. The solid residue was treated with distilled water to dissolve the zirconium sulphate. The water-insoluble silica and unreacted dissociated zircon were filtered from the zirconium sulphate solution which was then evaporated at its boiling point under atmospheric pressure until crystallization commenced. Crystallization was completed by allowing the solution to cool. The Zr(SO$_4$)$_2$.4H$_2$O crystals were filtered, washed with acetone, dried at 100° C., then calcined at 950° C. to produce high-purity zirconia (ZrO$_2$).

A typical product contained the following levels of impurities (ppm): SiO$_2$, 100; Al$_2$O$_3$, 220; Fe$_2$O$_3$, 130; and TiO$_2$, 90.

EXAMPLE 3

A leaching test using 100 g PDZ(−75+45 μm) was performed as described in Example 1. After 4 hours at constant temperature, heating was terminated and the suspension filtered. The solid residue was treated with 260 g of water to dissolve the zirconium sulphate. The water-insoluble silica and unreacted dissociated zircon were filtered from the zirconium sulphate solution. 370 g of 98% H$_2$SO$_4$ was added to the filtrate to effect quantitative crystallization of Zr(SO$_4$)$_2$.4H$_2$O.

EXAMPLE 4

A leaching test using 100 g of PDZ(−75+45 μm) was performed as described in Example 1. After 4 hours at constant temperature, heating was terminated and the suspension allowed to cool. 150 g of water was then added to the stirred suspension to dissolve the zirconium sulphate. The resulting hot suspension was filtered to remove the water insoluble silica and unreacted dissociated zircon. On cooling, the filtrate deposited $Zr(SO_4)_2.4H_2O$ crystals quantitatively.

We claim:

1. A process for the production of high-purity zirconia, which consists essentially of the steps of leaching dissociated zircon or zirconiferous material consisting essentially of a mixture of zirconia and silica with concentrated sulphuric acid, and thereafter separating the resulting zirconium-containing product from silica or any other unattacked impurity, characterized in that water formed during the leaching reaction is continuously removed from the system in such a way as to maintain the sulphuric acid concentration at about 98%, so that the leaching temperature is in the range from about 300° C. to the maximum boiling point of the concentrated acid.

2. A process as claimed in claim 1, wherein the leaching temperature is in the range 320° C.±5° C.

3. A process as claimed in claim 1, wherein the dissociated zircon or other zirconiferous material is finely ground prior to leaching.

4. A process as claimed in claim 1, wherein dissociated ziron is used which has been produced by thermal dissociation in an advanced electric reactor furnace.

5. A process as claimed in claim 1, wherein dissociated zircon is used which has been produced in a plasma arc furnace.

6. A process as claimed in claim 1, wherein following leaching excess acid is separated from the zirconium-containing product and the product is leached with water to produce a zirconium sulphate solution which is separated from the silica and other insoluble impurities.

7. A process as claimed in claim 1, wherein following leaching, water is added to reaction products in an amount sufficient to form a hot solution of zirconium sulphate which is separated from the silica and other insoluble impurities while still hot.

8. A process as claimed in claim 6 or 7, wherein the zirconium sulphate solution is treated to precipitate hydrated zirconium sulphate.

9. A process as claimed in claim 6, wherein after removal of the silica and other insoluble impurities, hydrated zirconia sulphate is precipitated from the solution by adjustment of the sulphate/water ratio.

10. A process as claimed in claim 6, wherein after removal of the silica and other insoluble impurities, hydrated zirconia sulphate is precipitated from the solution by evaporation of the solution.

11. A process as claimed in claim 7, wherein after removal of the silica and other insoluble impurities, the solution is cooled to precipitate hydrated zirconium sulphate.

12. A process as claimed in claim 8, wherein the zirconium sulphate is pyrolyzed to produce high purity zirconia.

13. A process as claimed in claims 4, 6 or 9, wherein the solution of zirconium sulphate or a solution of the redissolved hydrated zirconium sulphate is subject to pH adjustment to precipitate hydrated zirconium oxide.

14. A process as claimed in claim 13, wherein the pH of the solution is adjusted by addition of ammonia, urea or sodium hydroxide.

15. A process as claimed in claim 13 or 14, wherein the hydrated zirconium oxide is calcined to produce zirconia.

* * * * *

UNITED STATES PATENT AND TRADEMARK OFFICE
CERTIFICATE OF CORRECTION

PATENT NO. : 4,746,497

DATED : May 24, 1988

INVENTOR(S) : JENKINS et al

It is certified that error appears in the above-identified patent and that said Letters Patent is hereby corrected as shown below:

In the title page:

Please insert the PCT information after item [22] as follows:

[22] PCT filed Jan. 29, 1986

[86] PCT No. PCT/AU86/00018

§ 371 Date: Sept. 24, 1986

§ 102 (e) Date: Sept 24, 1986

[87] PCT Pub. No.: WO86/04614

PCT Pub. Date: Aug. 14, 1986

Signed and Sealed this

Eighteenth Day of April, 1989

*Attest:*

DONALD J. QUIGG

*Attesting Officer*  *Commissioner of Patents and Trademarks*